United States Patent
Menard et al.

(10) Patent No.: US 8,356,683 B2
(45) Date of Patent: Jan. 22, 2013

(54) MOTOR VEHICLE FRONT END SUBASSEMBLY

(75) Inventors: Magalie Menard, Auxelles Haut (FR); Caroline Riviere, Faverolles (FR); Claude Laurent, Voujeaucourt (FR)

(73) Assignee: Faurecia Bloc Avant, Nanterre (FR)

( * ) Notice: Subject to any disclaimer, the term of this patent is extended or adjusted under 35 U.S.C. 154(b) by 245 days.

(21) Appl. No.: 12/745,789

(22) PCT Filed: Dec. 3, 2008

(86) PCT No.: PCT/FR2008/052194
§ 371 (c)(1),
(2), (4) Date: Aug. 3, 2010

(87) PCT Pub. No.: WO2009/077707
PCT Pub. Date: Jun. 25, 2009

(65) Prior Publication Data
US 2010/0283292 A1    Nov. 11, 2010

(30) Foreign Application Priority Data
Dec. 3, 2007    (FR) ...................................... 07 59506

(51) Int. Cl.
*B62D 25/08* (2006.01)
(52) U.S. Cl. ...................................... 180/68.4; 180/68.6
(58) Field of Classification Search ................. 180/68.4, 180/68.6; 248/232; 296/193.09, 193.1
See application file for complete search history.

(56) References Cited

U.S. PATENT DOCUMENTS

| | | | |
|---|---|---|---|
| 6,223,811 B1 * | 5/2001 | Kodumudi et al. ........... | 165/121 |
| 6,470,961 B1 * | 10/2002 | Case ................................ | 165/78 |
| 6,668,956 B1 * | 12/2003 | Pelage et al. ................. | 180/68.4 |
| 6,684,937 B2 * | 2/2004 | Lenz et al. ....................... | 165/41 |
| 6,685,258 B2 | 2/2004 | Brogly et al. | |
| 6,883,589 B2 * | 4/2005 | Ozawa et al. .................... | 165/41 |
| 7,121,369 B2 * | 10/2006 | Beck et al. .................... | 180/68.4 |
| 7,150,335 B2 * | 12/2006 | Sasano et al. ................. | 180/68.4 |
| 7,562,733 B2 * | 7/2009 | Watanabe et al. ............ | 180/68.4 |
| 2002/0014322 A1 | 2/2002 | Ozawa et al. | |
| 2002/0079151 A1 | 6/2002 | Decker et al. | |

FOREIGN PATENT DOCUMENTS

| | | |
|---|---|---|
| DE | 102 33 626 | 2/2003 |
| EP | 1 188 645 | 3/2002 |
| EP | 1 216 913 | 6/2002 |
| EP | 1 857 316 | 11/2007 |

OTHER PUBLICATIONS

International Search Report dated Jul. 30, 2009, from corresponding PCT application.

* cited by examiner

*Primary Examiner* — John Walters
*Assistant Examiner* — Brian Swenson
(74) *Attorney, Agent, or Firm* — Young & Thompson

(57) ABSTRACT

A motor vehicle front end subassembly includes a support surround (6), an air-ducting panel (8) and a radiator (12) which are arranged one behind the other across the support surround (6), and a motor fan unit (4) arranged facing an opening (24) of the panel (8), the panel (8), the motor fan unit (4) and the radiator (12) being supported by the support surround (6). At least one of the radiator (12) and the motor fan unit (4) are supported by the support surround (6) separately from the panel (8).

12 Claims, 4 Drawing Sheets

MOTOR VEHICLE FRONT END SUBASSEMBLY

The present invention relates to a motor vehicle front end subassembly comprising a support surround, an air-ducting panel and a radiator which are arranged one behind the other across the support surround, and a motor fan unit arranged facing an opening of the panel, the panel, the motor fan unit and the radiator being supported by the support surround.

EP 1 188 645 A1 describes a front end subassembly of that type in which the motor fan unit is secured to the air-ducting panel which is itself secured to the metal surround.

An object of the invention is to provide a motor vehicle front end subassembly which is light and which is inexpensive to manufacture.

To that end, the invention proposes a motor vehicle front end subassembly of the above-mentioned type, characterised in that at least one of the radiator and the motor fan unit is supported by the support surround separately from the panel.

According to other embodiments, the front end subassembly comprises one or more of the following features taken in isolation or according to any technically possible combination:
  the motor fan unit is supported individually by the support surround;
  the radiator is supported individually by the support surround;
  the panel is supported individually by the support surround;
  the subassembly comprises a condenser for an air-conditioning system, the condenser being supported individually by the support surround;
  the support surround is produced from magnesium;
  the support surround is produced in an integral manner in one piece;
  the air-ducting panel is produced from plastics material.

The invention relates also to a motor vehicle comprising a subassembly according to any one of the preceding claims.

The invention relates also to a series of motor vehicle front end subassemblies comprising first front end subassemblies of the above-mentioned type having identical support surrounds and identical air-ducting panels, and second front end subassemblies of the above-mentioned type having support surrounds identical to those of the first subassemblies, and air-ducting panels identical to each other but different from those of the first subassemblies.

Figure 1:
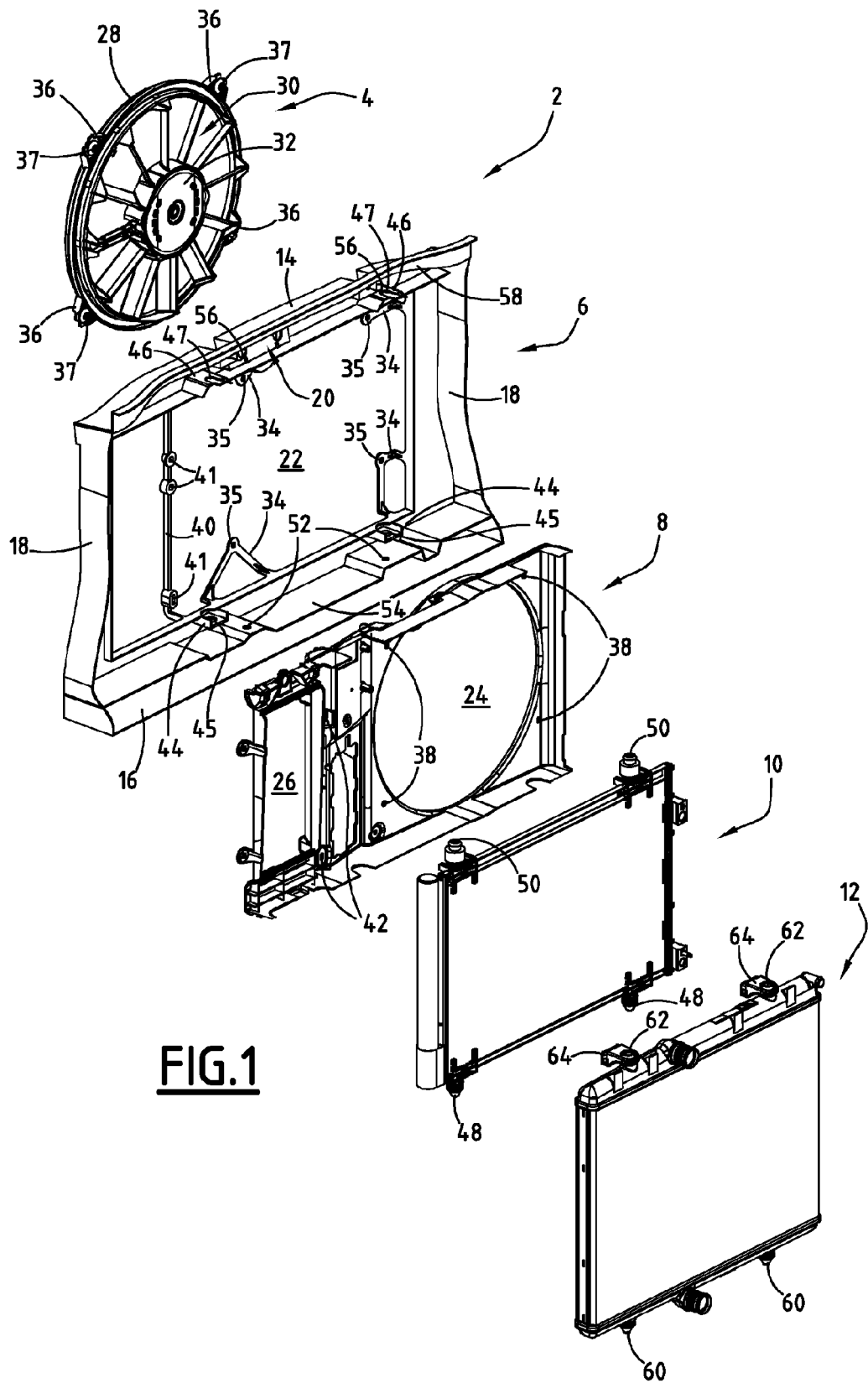
Figure 2:
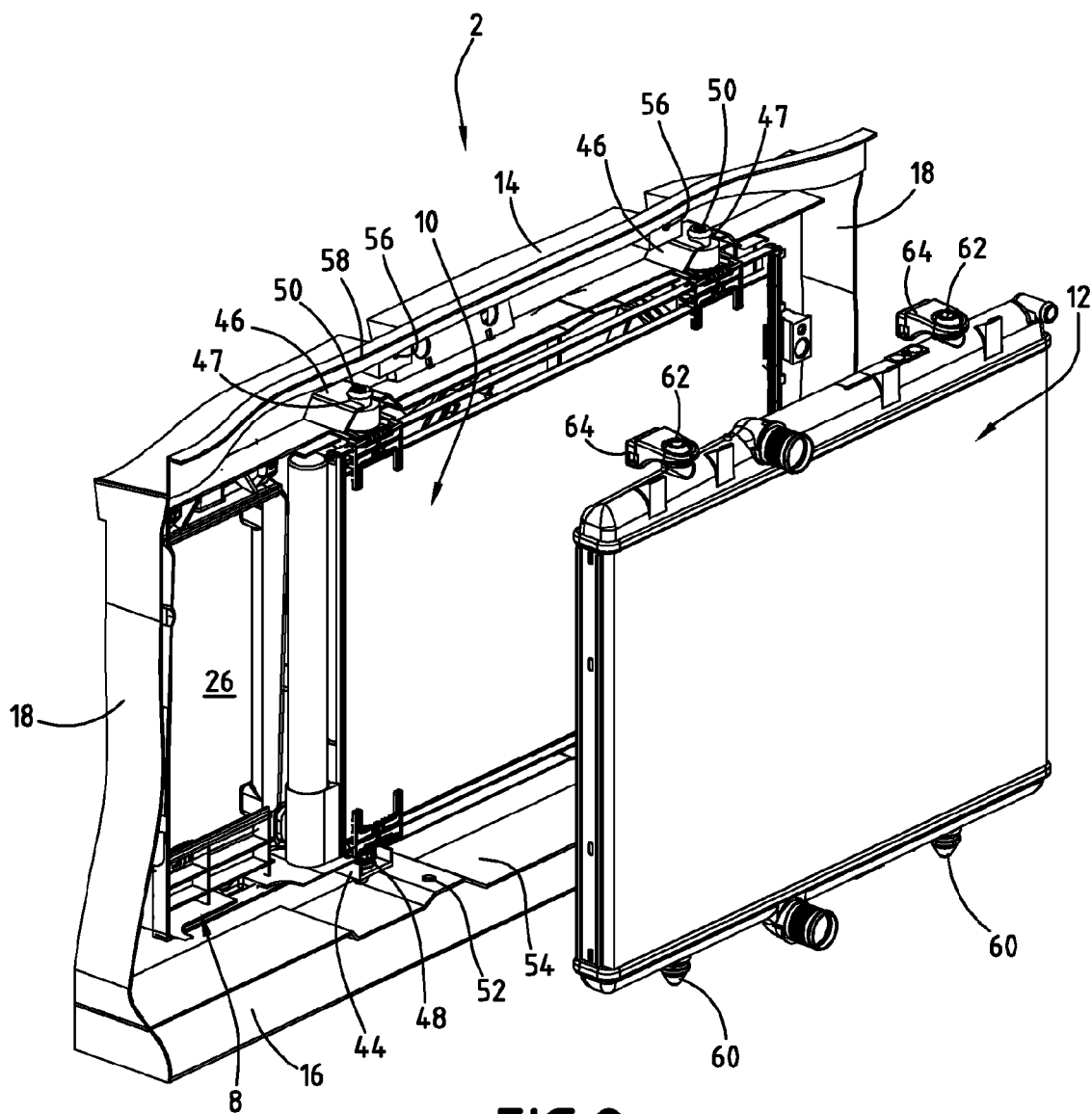
Figure 3:
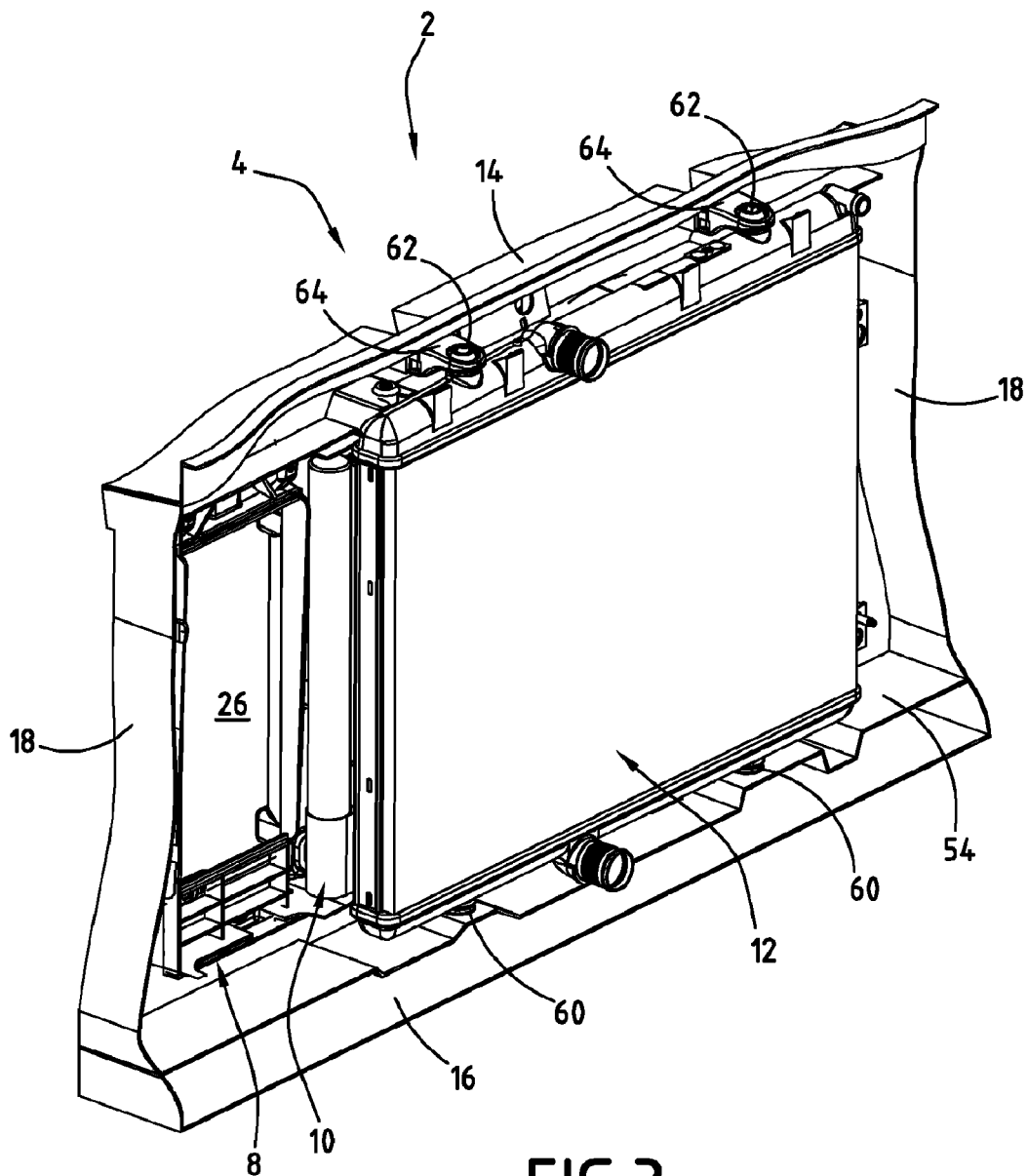
Figure 4:
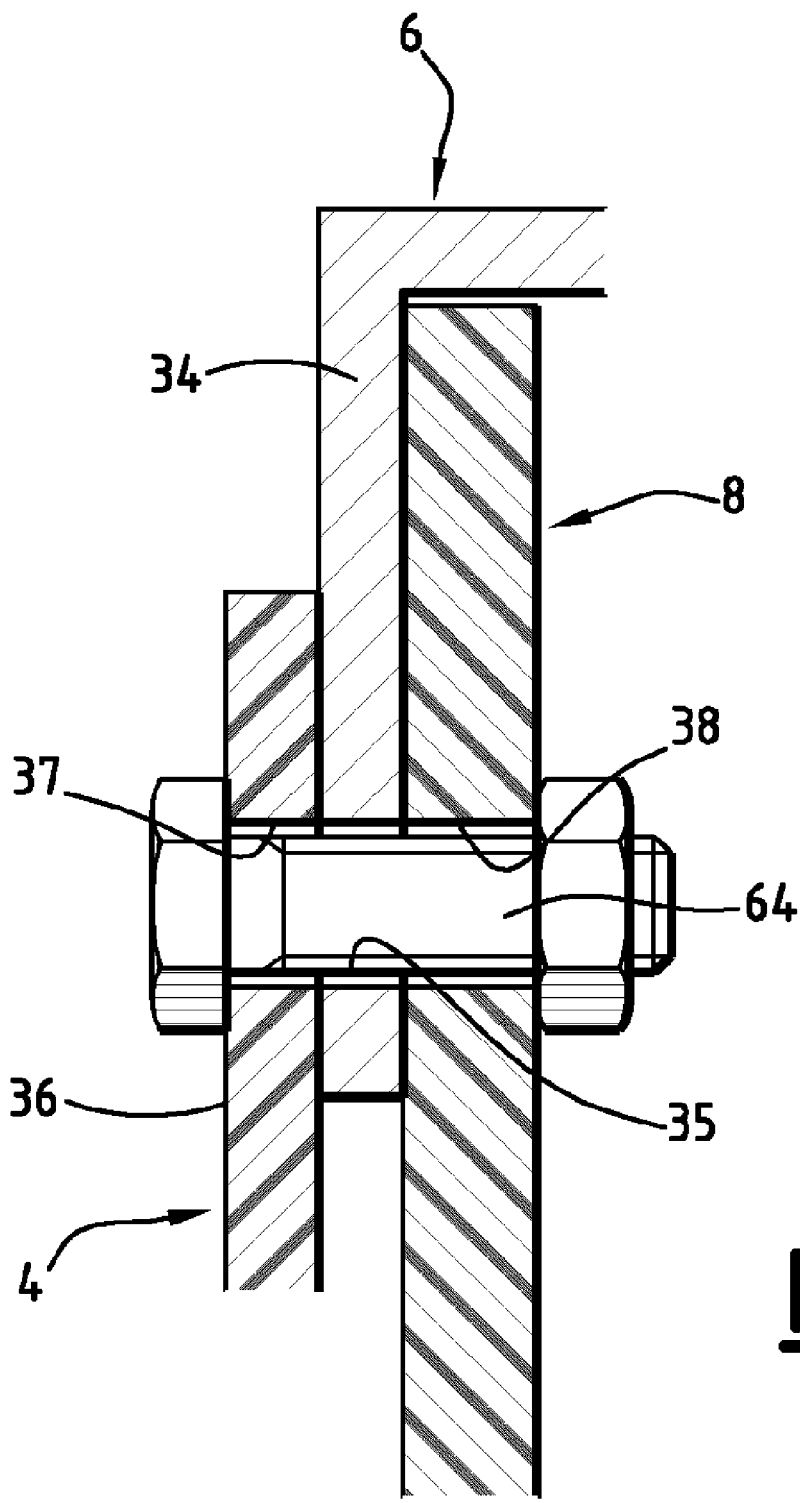

The invention and its advantages will be better understood on reading the following description which is given purely by way of example and with reference to the appended drawings in which:

FIGS. 1 to 3 are diagrammatic perspective views of a motor vehicle front end subassembly according to the invention, before assembly, partially assembled and assembled, respectively; and FIG. 4 is a sectional diagrammatic view illustrating a detail of the front end subassembly of FIGS. 1 to 3.

As shown in FIG. 1, the motor vehicle front end subassembly 2 comprises a motor fan unit (MFU) 4, a support surround 6, an air-ducting panel 8, a condenser 10 and a radiator 12.

The surround 6 is to be secured to the front end of the structure (not shown) of a motor vehicle, in particular to the front ends of the lower front longitudinal members of a structure, delimiting the engine compartment. The surround 6 is arranged to extend in a substantially vertical and transverse plane of the motor vehicle.

The surround 6 has a generally rectangular shape. It comprises an upper cross-member 14, a lower cross-member 16, and uprights 18 connecting the cross-members 14, 16.

The upper cross-member 14 comprises substantially at its centre a region 20 for receiving and securing a bonnet lock hook (not shown).

The surround 6 defines a surround opening 22 of rectangular shape. The MFU 4, the panel 8, the condenser 10 and the radiator 12 are to be arranged facing the surround opening 22.

The panel 8 has a substantially rectangular outer contour complementing that of the surround opening 22. It comprises a main opening 24 and an auxiliary opening 26 for the passage of air which are located next to each other. The main opening 24 has a circular shape and the auxiliary opening 26 has a vertically elongate rectangular shape.

The condenser 10 and the radiator 12 are mounted behind the panel 8, the radiator 12 being arranged behind the condenser 10. They each have a rectangular shape fitting substantially in that of the surround opening 22.

The condenser 10 is a condenser of an air-conditioning system of the passenger space of the motor vehicle. The radiator 12 is a radiator of a cooling system of an engine of the motor vehicle.

In the example illustrated, the MFU 4 is arranged to be mounted in front of the panel 8, facing the opening 4, in order to force a flow of air through the condenser 10 and the radiator 12 when the MFU is activated.

The MFU 4 comprises a support collar 28, a helix 30 mounted rotatably on the collar 28, and a motor 32 for driving the helix 30 in rotation. The motor 32 is secured in a conventional manner at the centre of the collar 28 and carries the helix 30 with a view to driving it in rotation.

The auxiliary opening 24 is to receive in known manner flaps (not shown) which are mounted in such a manner as to open when the vehicle is travelling beyond a predetermined speed, under the effect of a flow of air striking the face of the panel 8 oriented towards the front of the vehicle, and which are urged into a closing position by return means. Such flaps open to increase the flow of air in the direction towards the engine compartment when the vehicle is travelling above the threshold speed.

The surround 6 is arranged to support individually each of the MFU 4, the panel 8, the condenser 10 and the radiator 12.

To that end, the surround 6 comprises first members for securing and supporting the MFU 4.

The first securing and supporting members comprise lugs 34 projecting from an edge of the surround opening 22 towards the centre of the surround opening 22. The lugs 34 are integral with the surround 6. Each lug 34 is provided with a securing orifice 35.

The MFU 4 comprises fasteners 36 which are each provided with a securing orifice 37. The fasteners 36 are distributed around the collar 28 in such a manner as to be able to align the securing orifices 37 of the fasteners 36 with those 35 of the lugs 34 in order to secure the MFU 4 to the surround 6 by means of a securing device, such as a bolt or a rivet, arranged through each pair of aligned orifices 35, 37.

The surround 6 comprises second members for securing and supporting the panel 8.

The second securing and supporting members comprise the lugs 34. The panel 8 has securing orifices 38 distributed around the main opening 24 and arranged to be aligned with those 35 of the lugs 24.

By way of variation or optionally, the second securing and supporting members also comprise a rod 40 integral with the surround 6 and extending across the surround opening 22, between the cross-members 14 and 16. The rod 40 is provided with securing orifices 41.

In that case, the panel 8 comprises securing orifices 42 arranged to be aligned with those of the rod 40 in order to secure the panel 8 to the surround 6 by means of a securing device, such as a bolt or a rivet, arranged through each pair of aligned orifices 41, 42.

By way of variation or optionally, the second securing and supporting members comprise securing orifices (not shown) which are distributed around the surround and which are arranged, in particular, on the uprights 18, and the panel 8 comprises corresponding securing orifices on its periphery.

The surround 6 comprises third members for securing and supporting the condenser 10.

The third securing and supporting members comprise flanges 44, 46 integral with the surround 6. The flanges 44, 46 comprise a pair of lower flanges 44 distributed along the lower cross-member 16, and a pair of upper flanges 30 distributed along the upper cross-member 14.

The lower flanges 44 are provided with securing orifices 45. The upper flanges 46 are provided with notches 47 which are open towards the rear.

The condenser 10 comprises a pair of lower fingers 48 which are arranged along a lower edge of the condenser and which are to be inserted into the orifices of the lower flanges 44, and a pair of upper fingers 50 which are to be snapped into the notches of the upper flanges 46.

The condenser 10 is mounted on the surround 6 by arranging the condenser in a rearwardly inclined position, then by inserting the lower fingers 48 into the orifices of the lower flanges 44, and then by swinging the condenser 10 upwards until the upper fingers 50 snap into the notches 47 of the upper flanges 46.

FIG. 2 illustrates the subassembly 2 after the mounting of the MFU 4, the panel 8 and the condenser 10 on the surround 6, and before the mounting of the radiator 12 on the surround 6.

The surround 6 comprises fourth members for securing and supporting the radiator 12.

The fourth securing and supporting members comprise securing orifices 52 formed in a wing 54 of the lower cross-member 16, and securing orifices 56 formed at the bottom of recesses formed in a wing 58 of the upper cross-member 14.

The radiator 12 comprises a pair of lower pins 60 which are arranged along a lower edge of the radiator 12 and which are to be inserted into the securing orifices 52, and a pair of upper pins 62 which are arranged along an upper edge of the radiator 12. The radiator 12 comprises securing pieces 64 engaged on the upper pins 62 and arranged to be screwed on to the upper cross-member 14 by means of the securing orifices 52.

As shown in FIG. 4, each lug 34 is sandwiched between a fastener 36 of the MFU 4 and the panel 8, a securing device 64 extending through the fastener 36, the lug 34 and the panel 8.

The securing device 64 transmits, on the one hand, the weight of the panel 8 to the surround 6 and, on the other hand, the weight of the MFU 4 to the surround, without the MFU 4 and the panel 8 supporting each other.

The MFU 4 and the panel 8 therefore use the same securing members, but the MFU 4 and the panel 8 are supported separately from each other by the surround 6, without the MFU 4 and the panel 8 supporting each other.

The surround 6 supports individually each of the MFU 4, the panel 8, the radiator 12 and the condenser 10. In other words, none of the MFU 4, the panel 8, the radiator 12 and the condenser 10 supports the weight of another of those functional devices. In particular, the panel 8 does not support any of the MFU, the radiator 12 and the condenser 10.

In particular, the MFU 4 and the radiator 12 are supported by the surround 6 separately from the panel 8, i.e. without the panel 8 supporting the weight of the MFU 4 or of the radiator 12, and without the MFU 4 or the radiator 12 supporting the panel 8.

The panel 8 therefore does not assume a structural function of supporting the MFU 4, the condenser 10 or the radiator 12. It is therefore possible to provide a lighter panel 8 of low mechanical strength by using a less dense or less strong material, or smaller material thicknesses. The panel 8 is readily produced in an integral manner in one piece, by injection-moulding of plastics material.

A surround 6 of sufficient mechanical strength is preferably produced from metal, preferably in an integral manner in one piece, for example by moulding or injection-moulding. A light metal surround 6 is obtained by producing the surround 6 from magnesium or a magnesium alloy.

The result is that the subassembly 2 is light, while being strong and inexpensive to manufacture.

It will be appreciated that the panel 8 can be used to support light members, such as the end portions of the feed tubes of the condenser 10 or of the radiator 12, or the end portions of the electrical wires supplying power to the motor of the MFU 4. On the other hand, the panel 8 is not used to support the weight of the other functional devices (MFU 4, condenser 10 or radiator 12) supported by the surround 6.

The securing of the MFU 4 and the panel 8 to the surround 6 by means of the same securing and supporting members (lugs 24) permits a reduction in the weight of the surround as well as in the number of assembly operations and in the cost of manufacturing the subassembly 2.

In a variant, the surround 6 comprises separate securing members for the panel 8 and the MFU 4.

In a variant of the motor vehicle front end subassembly without an air-conditioning system, the front end subassembly does not comprise a condenser.

In a variant, the upper cross-member 14 of the surround 6 comprises lengthened portions which extend laterally beyond the uprights 18 and which are to be secured to the structure of the vehicle, in particular to the longitudinal wing members, in order to increase the rigidity of the subassembly, and optionally to provide for additional functions, for example the securing of optical units.

It is also possible to effect economies of scale by using the same surround 6 for different motor vehicles.

To that end, it is possible to manufacture a series of motor vehicle front end subassemblies comprising first front end subassemblies according to the invention having identical support surrounds and identical air-ducting panels, and second front end subassemblies according to the invention having support surrounds identical to those of the first subassemblies, and air-ducting panels identical to each other but different from those of the first subassemblies.

The result is that the manufacturing costs are recouped more rapidly for the metal support surround, the manufacture of which is more expensive than that of the air-ducting panels.

This method of creating motor vehicle subassemblies is particularly suitable for motor vehicles using the same technical platform.

Preferably, a support surround which is common to several ranges of vehicle using the same platform and which is to receive air-ducting panels and/or functional devices (MFU, radiator, condenser . . . ) which differ depending on the version involved, comprises in advance all of the securing points necessary for the various versions in order to satisfy the diversity of the products.

The invention claimed is:

1. Motor vehicle front end subassembly comprising:
a support surround (6);
an air-ducting panel (8);
a radiator (12), the radiator and the air-ducting panel arranged one behind the other across the support surround (6); and
a motor fan unit (4) arranged facing an opening (24) of the panel (8), wherein,
the surround comprises i) an opening, ii) securing members securing and supporting the motor fan unit and the air-ducting panel, the securing members projecting inwardly from the surround, and iii) a securing device extending through the securing members, the motor fan unit and the air-ducting panel,
the panel (8), the motor fan unit (4) and the radiator (12) are supported by the support surround (6), and
at least one of the radiator (12) and the motor fan unit (4) is supported by the support surround (6) separately from the panel (8).

2. Subassembly according to claim 1, wherein the motor fan unit (4) is supported individually by the support surround (6).

3. Subassembly according to claim 2, wherein the radiator (12) is supported individually by the support surround (6).

4. Subassembly according to claim 1, wherein the radiator (12) is supported individually by the support surround (6).

5. Subassembly according to claim 1, wherein the panel (8) is supported individually by the support surround (6).

6. Subassembly according to claim 1, comprising a condenser (10) for an air-conditioning system, the condenser (10) being supported individually by the support surround (6).

7. Subassembly according to claim 1, wherein the support surround (6) is produced from magnesium.

8. Subassembly according to claim 1, wherein the support surround (6) is produced in an integral manner in one piece.

9. Subassembly according to claim 1, wherein the air-ducting panel (8) is produced from plastics material.

10. Subassembly according to claim 1, wherein the support surround (6) comprises a lower cross-member (16), an upper cross-member (14), and uprights (18) connecting the cross-members (14, 16).

11. Motor vehicle comprising a subassembly according to claim 1.

12. Subassembly according to claim 1, wherein,
the securing members are sandwiched between the motor fan unit and the air-ducting panel.

* * * * *

UNITED STATES PATENT AND TRADEMARK OFFICE
CERTIFICATE OF CORRECTION

| | | |
|---|---|---|
| PATENT NO. | : 8,356,683 B2 | Page 1 of 1 |
| APPLICATION NO. | : 12/745789 | |
| DATED | : January 22, 2013 | |
| INVENTOR(S) | : Menard et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this

First Day of September, 2015

Michelle K. Lee
*Director of the United States Patent and Trademark Office*